Sept. 25, 1928.
O. E. MORRIS ET AL
1,685,554
COTTON PLANTER ATTACHMENT
Filed Aug. 6, 1927
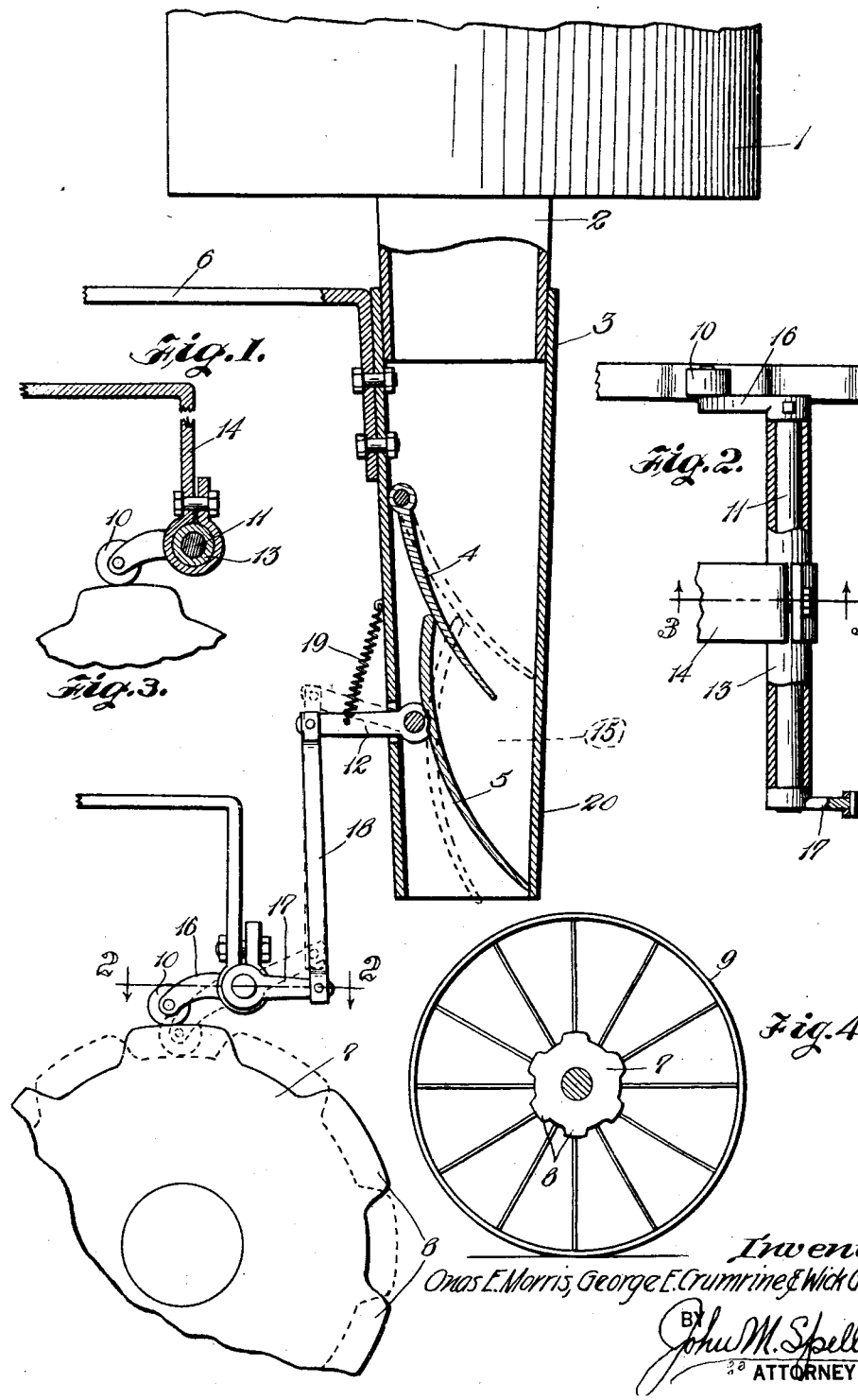
Inventors
Onas E. Morris, George E. Crumrine & Wick Grounds.
BY John M. Spellman
ATTORNEY Patented Sept. 25, 1928.

1,685,554

UNITED STATES PATENT OFFICE.

ONAS E. MORRIS, GEORGE E. CRUMRINE, AND WICK GROUNDS, OF CEDAR HILL, TEXAS.

COTTON-PLANTER ATTACHMENT.

Application filed August 6, 1927. Serial No. 211,125.

The invention relates to a device for dispensing seed or other material in predetermined quantity, such device being suitable for use as an attachment for cotton and corn planters. The principal object of the invention is to provide an improved means for dropping seed intermittently and in proper proportions, thereby causing the seed to grow in hills rather than in rows. This obviates the necessity for choping out intermediate plants, and results in reducing the cost of producing the crop.

The invention will be more clearly understood by reference to the accompanying drawing, in which:—

Fig. 1 is a view partly in section and partly in elevation showing the attachment in place on a hopper of the type now in use on the regular cotton or corn planter.

Fig. 2 is a section taken on line 2—2 of Fig. 1.

Fig. 3 is a section taken on line 3—3 of Fig. 2.

Fig. 4 is an elevation showing an ordinary planter wheel with the lugged gear attached that is necessary for actuating the valves in our attachment.

In the drawings the reference numeral 1 denotes a box or hopper for containing the seed of an ordinary cotton or corn planter, said hopper being provided with a short spout 2 which is preferably square in cross-section. An extension spout 3 extends from the spout 2 and may be held in place by means of a bracket 6 which is attached to the planter at any convenient location. Hingedly secured to one wall of and extending into the spout 3 is an upper valve 4, while a lower valve 5, likewise extending into the spout 3, is secured to an arm 12 which is designed to be operated through intermediate levers, preferably from a gear 7 carried by the wheel of the planter, though other operating means may be employed if desired.

The gear 7 is provided with any suitable number of teeth or lugs 8 and serves to intermittently actuate the valves 5 and 4 through the roller 10, which rides over the lugs as the gear rotates, and through intermediate connections. Gears with any desired number of lugs may be provided according to the desired spacing of the hills.

As the roller 10 is alternately raised or lowered by the lugs 8 motion is imparted to a rocker shaft 11 having arms 16 and 17, the arm 16 carrying the roller 10 and the arm 17 being hinged to a lever 18 to the upper end of which is hingedly attached the arm 12 which carries the valve 5. A tension spring 19 preferably reacts between the arm 12 and the wall of the spout 3.

The rocker shaft 11 is preferably carried by a sleeve 13 which is suitably supported from some convenient portion of the planter by means of a bracket 14.

It will be noted that the upper valve 4 rests at all times upon the top of valve 5, and it will be further noted that the arrangement of levers and various connecting parts is such that when the roller 10 rides upon a lug or tooth 8 of the gear 7, as shown in full lines in the drawing, the lower valve 5 extends to the opposite wall 20 of the spout 3, closing it at the bottom, while, at the same time, the valve 4 swings downwardly allowing seed to drop from above and to fill the pocket or space 15 between the valves 4 and 5, thus insuring a determined quantity being trapped in such portion. When, however, the roller 10 drops into the space between teeth 8, as shown in dotted lines, the lower portion of the valve 5 is withdrawn from the wall 20, allowing the seed to drop from the pocket 15, while at the same time the upper portion of valve 5 moves forwardly, engaging valve 4 and shoving it over against the wall 20 closing the pocket 15 at the top and preventing further access of seed until the valves again return to the full line portion.

The operation continues with lug 8 and depression between the lugs, seed being dropped from the hopper box 1 to fill the spout and the pocket 15 whenever the valve 5 is closed and the valve 4 open.

In this manner it is obvious that exactly the right quantity of seed may be dropped at the proper interval, this being the principal object of the invention. Obviously, the device may be varied in detail without departing from the spirit of the invention.

What we claim is:—

A predetermined-bulk dispensing device adapted for use in connection with the hopper of a cotton planter or the like, comprising a spout leading from said hopper, upper and lower valves positioned in said spout, said lower valve being positioned adjacent the lower end of said spout to open and close the same, means for actuating said lower valve, comprising a valve arm projecting freely through an opening in the wall of said spout and having its inner end secured to said lower valve, means for normally holding said valve arm in elevated position, a gear wheel actuated by said planter and provided with teeth, a rock shaft mounted adjacent said teeth and having its ends extended to form rock arms, a roller engaging said teeth and journaled in the free end of one of said rock arms, a link connecting the free ends of said other rock arm and said valve arm, said upper valve having its upper end hinged to said spout adjacent the upper end thereof and having its lower end resting against the upper end of said lower valve.

In testimony whereof we affix our signatures.

ONAS E. MORRIS.
GEORGE E. CRUMRINE.
WICK GROUNDS.